Jan. 20, 1948.  E. N. KEMLER  2,434,701
GLIDER AND CARGO PICK-UP
Filed May 15, 1944  5 Sheets-Sheet 4
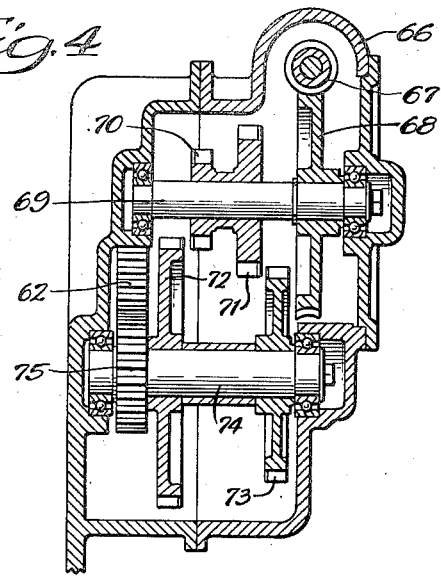
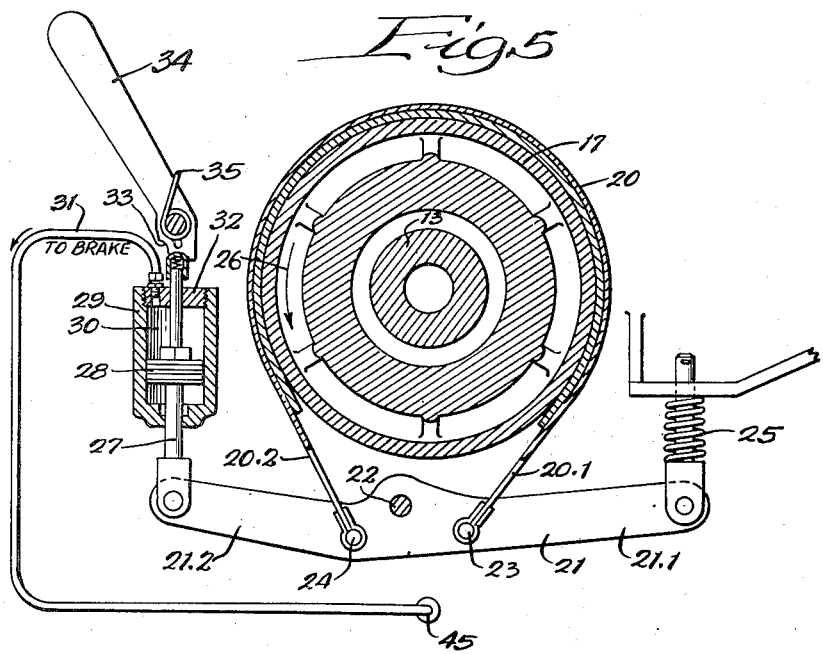
Inventor:
Emory N. Kemler,
By Kemler, Kemler & Davis,
Attorneys.

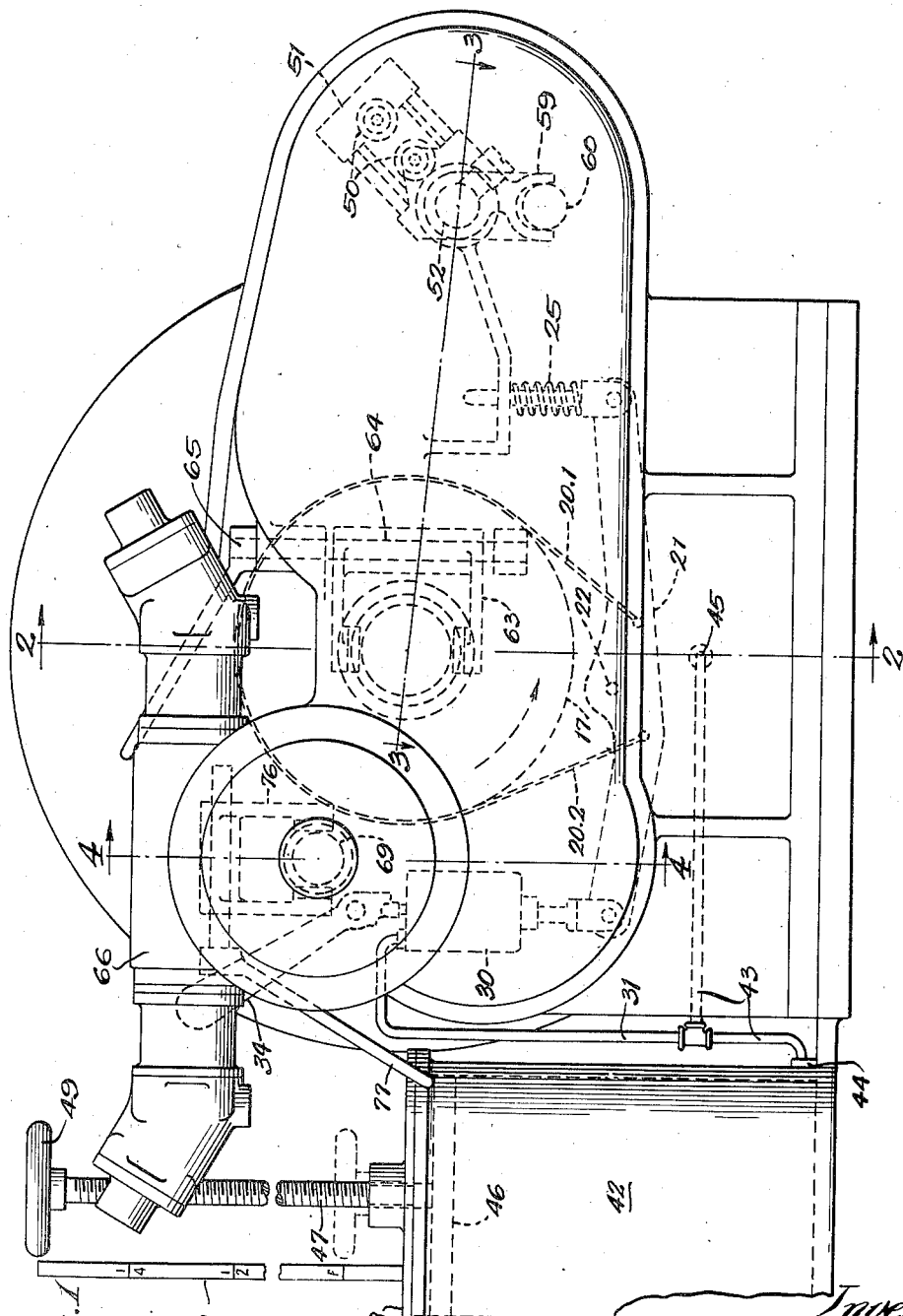

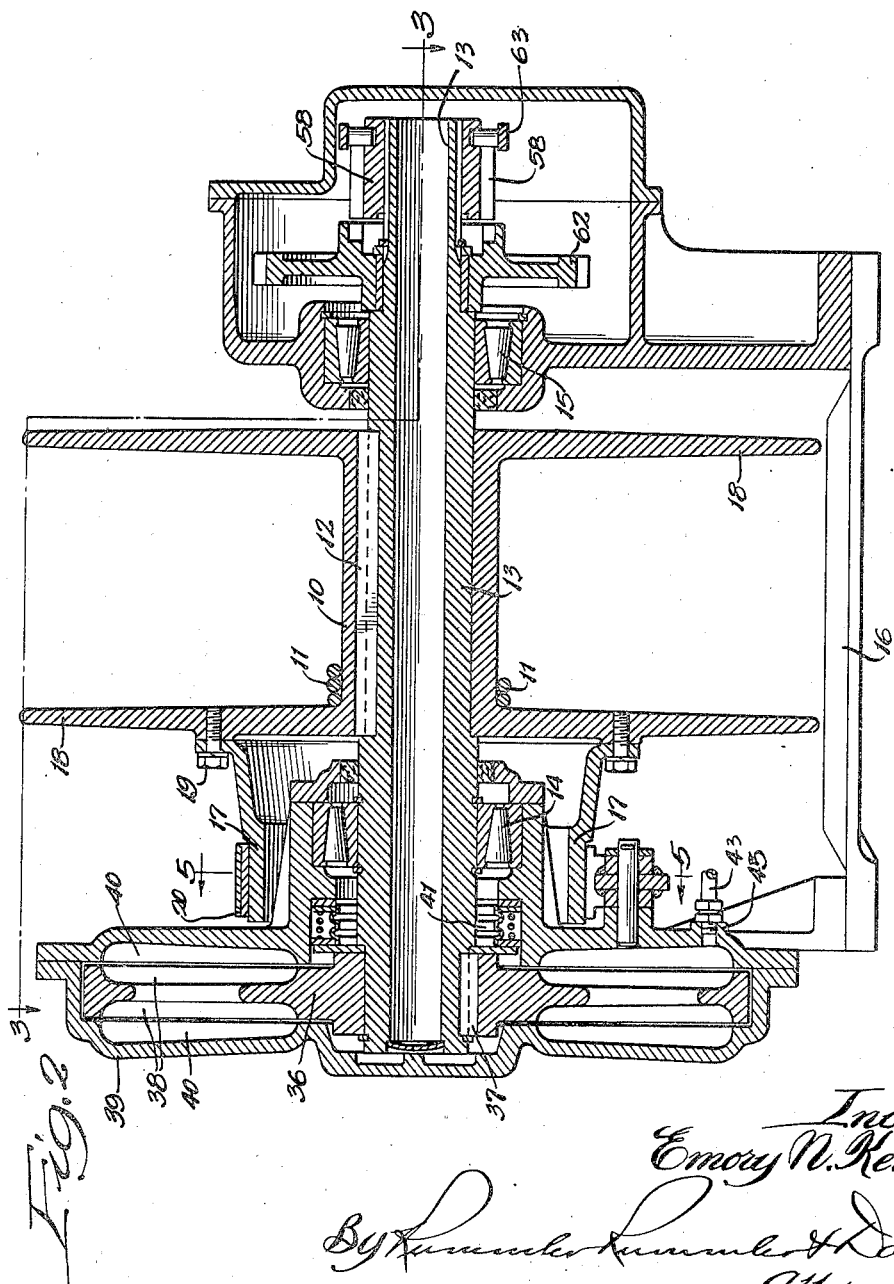

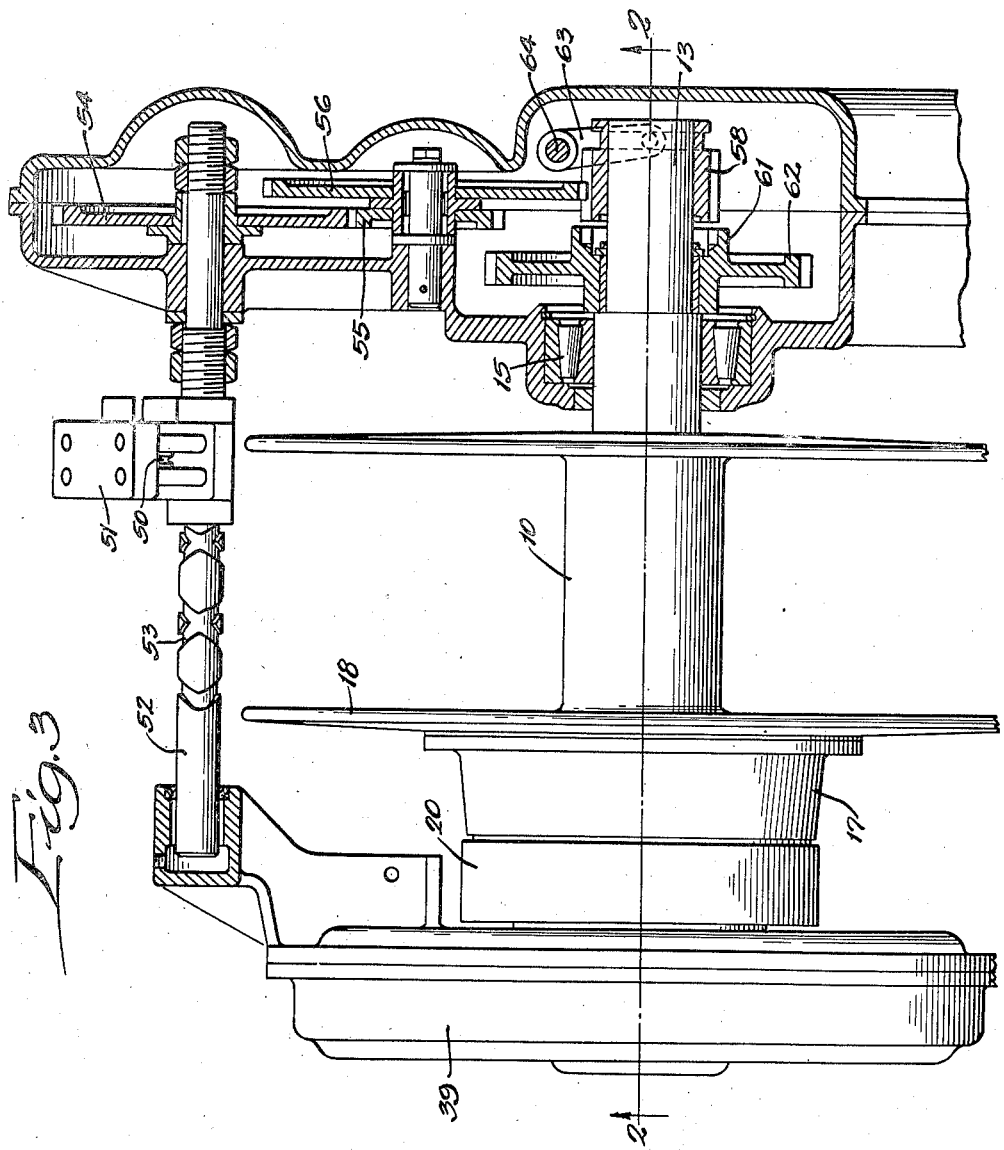

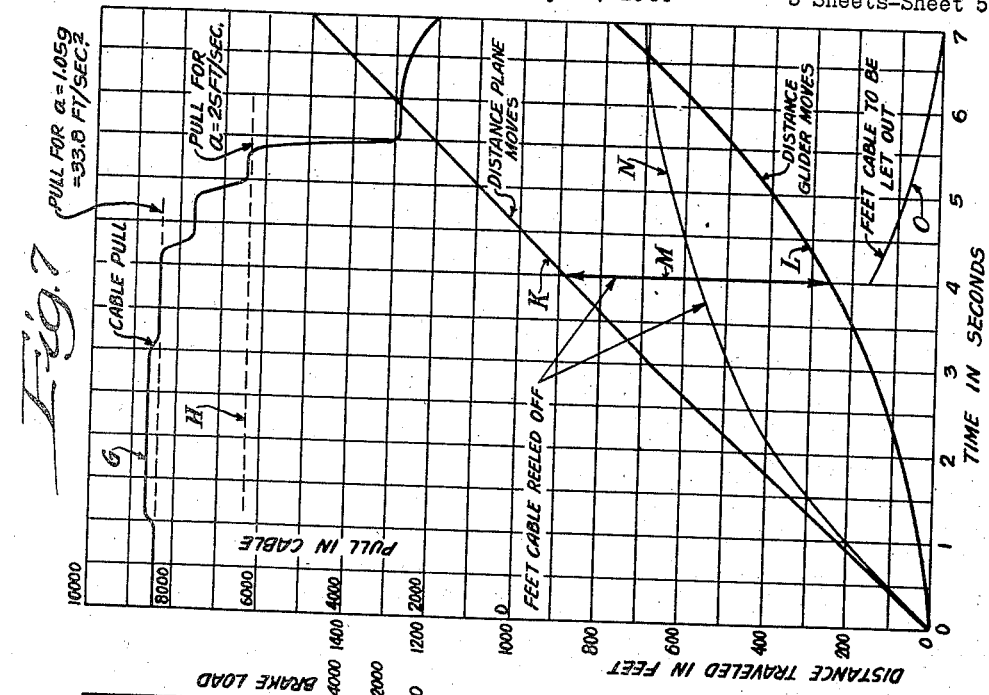
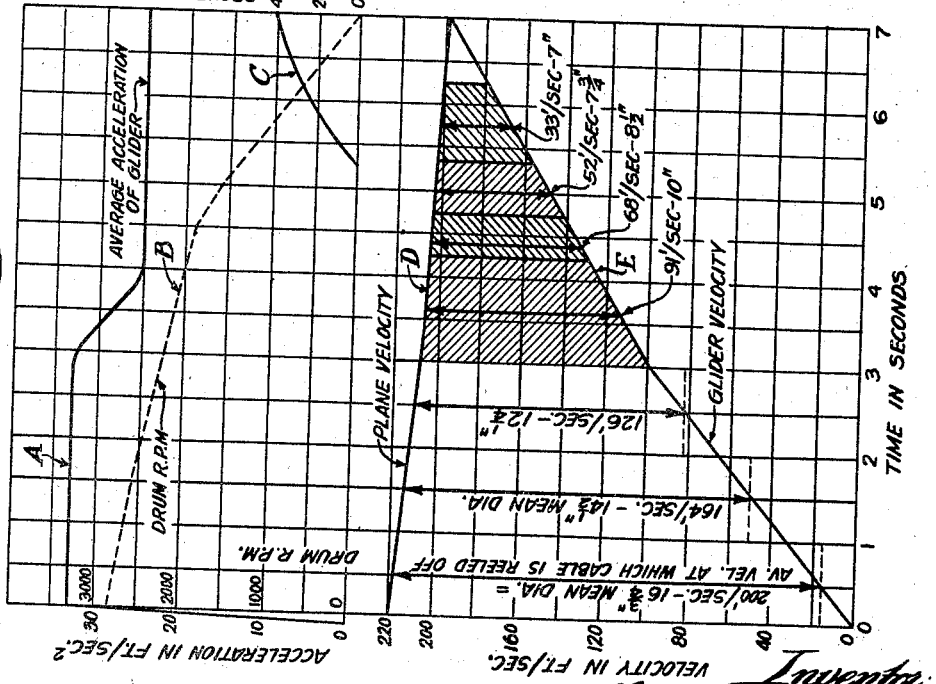

Patented Jan. 20, 1948

2,434,701

UNITED STATES PATENT OFFICE 2,434,701

GLIDER AND CARGO PICKUP

Emory N. Kemler, West Lafayette, Ind., assignor to Muncie Gear Works, Inc., Muncie, Ind., a corporation of Indiana Application May 15, 1944, Serial No. 535,652

10 Claims. (Cl. 254—160)

This invention relates to towing mechanism and particularly to equipment for enabling an airplane to pick up a glider or other load with a minimum of shock both at the plane and the object being picked up.

The picking up of a stationary object, such as a glider or freight cargo, by a moving plane requires the introduction of some means for eliminating the shock or impact forces and for absorbing the difference in instantaneous energy or power requirements at the plane and object being picked up if the pull is to be limited so as to be handled by a comparatively light cable and winch mechanism.

The main objects of this invention are to provide an improved form of glider and cargo pickup mechanism for airplanes; to provide improved means for reducing shock, reducing cable strain and absorbing differences in instantaneous energy or power requirements at the plane as the object being picked up is brought up to speed; to provide an improved form of brake mechanism for a towing winch; to provide an improved winch structure in which braking resistance to the running out of a towing cable is accomplished by utilizing fluid pressure and mechanical means as complementary braking media for various speeds of rotation of the towline reel, whereby at high speeds the braking effect is hydraulic and at low speeds is mechanical; to provide improved means for automatically shifting from hydraulic brake to friction brake according to the speed of rotation of the reel; to provide improved means for adjusting the holding power of the braking mechanism to suit a wide variation in the weight of glider or other cargo to be handled; and to provide improved means for rewinding the towing cable on the reel with a minimum of resistance while the brake mechanism remains set for holding a load on the cable.

In the embodiment of the invention herein shown and described, simple forms of hydraulic and friction brakes are combined in such manner as to take care of the absorption of energy and varying strains incidental to the pick-up operation with a structure that is relatively free from wear and sensitivity to temperature changes.

The system herein described can be easily adjusted to provide for wide variation in the size of glider or weight to be picked up and also possesses characteristics which make it able to take care of reasonable variations in plane contact speed. It utilizes liquid pressure as the principal braking medium at high speeds of cable drum revolution and mechanical friction or combined mechanical and fluid braking as a braking medium at low speeds.

The primary advantage of the fluid braking is its reliability, ability to repeat, ease of control for various loads and contact speeds; and the primary function of the mechanical or friction brake is to establish the initial pulling force, to hold the load when the cable drum is at rest and to assist in the last few revolutions of the drum in bringing the glider or other load up to the speed of the plane. A differential band brake actuated by a spring at low speeds and kept out of engagement by fluid pressure at high speeds is used as the mechanical braking means.

When the cable is being rewound by the rewind motor, the friction brake, being of a differential type, will exert very low torque and can consequently be left in continuous operation. If then, for some reason, the rewind motor were to be disconnected, the friction brake would automatically take hold.

When the drum is rotated by the pull on the cable upon picking up a load, the mechanical brake will, for a very small fraction of a second, be in operation. As soon as the drum reaches a predetermined speed, the hydraulic brake, acting as a centrifugal pumping device, will develop sufficient pressure to move a jack piston and release the friction brake. The friction brake is then held inoperative until the speed of the drum falls to some predetermined slower speed when the friction brake will take hold and help to stop and hold the drum.

The minimum shock or impact forces at starting that are due to the frictional resistance of the mechanical brake and other energy expended in getting the drum up to speed, which are essential to setting the load in motion, can most conveniently be absorbed by the elasticity of the length of nylon cable.

A specific embodiment of this invention is shown in the accompanying drawings in which:

Figure 1 is a side elevation of a winch mechanism particularly designed for use on airplanes in the picking up of glider or freight cargo while the airplane is under way.

Fig. 2 is a section taken on the plane of the lines 2—2 of Figs. 1 and 3 and showing the relation of the cable reel to its brake mechanism.

Fig. 3 is a fragmentary top plan view, with certain parts in section on line 3—3 of Fig. 1.

Fig. 4 is a sectional detail of the rewinding mechanism taken on line 4—4 of Fig. 1.

Fig. 5 is a detail partly in elevation and partly in section of the friction brake mechanism.

Fig. 6 is an illustrative graphic chart showing in its lower part the time relation of plane and glider velocities and in the upper part the time relation of glider acceleration and drum speeds; and Fig. 7 is an illustrative graphic chart showing the relation of the pull on the cable to the amount of cable reeled off according to time intervals during the pick-up operation.

In general the device shown comprises a towing cable reel equipped with both mechanical and hydraulic brakes, the mechanical brake being under certain circumstances controlled by the hydraulic brake, whereby these two brake mechanisms operate in complementary relation to each other so that the hydraulic brake functions at high speeds and the mechanical brake at low speeds of the cable drum. The device also includes power-driven rewinding mechanism for rotating the drum against the pull on the cable and level winding mechanism for distributing the cable properly over the surface of the drum.

The form shown in the drawings comprises a drum or reel 10 for a towing cable 11. A key 12 secures the drum 10 to a shaft 13 which is mounted in bearings 14 and 15 in a supporting frame having a base 16.

The mechanical or friction brake mechanism comprises a brake drum 17 fastened to the flange 18 of the cable drum by means of bolts 19. The brake drum 17 coacts with a brake band 20 which has its ends connected in differential relation to a lever 21 fulcrumed at 22. The end 20.1 of the brake band is fastened at 23 and the end 20.2 is fastened at 24 to the lever 21. A spring 25 normally depresses an arm 21.1 of the lever 21 and applies a predetermined pull on the brake band opposing the braking rotation of the brake drum 17 in the direction of the arrow 26.

The opposite arm 21.2 of the lever 21 is pivoted to the stem 27 of a piston 28 in a hydraulic jack cylinder 29. The chamber 30 in the jack cylinder 29 is connected by a pipe 31 with the hydraulic brake which will be hereinafter described.

The stem 27 extends upwardly through the head 32 of the cylinder 29 where it coacts with a cam surface 33 on the lever 34 whereby the piston 28 may be set for a predetermined brake resistance. The lever 34 is provided with a light spring 35 that throws it out of the way to release the cam 33 from interference with the upward movement of the jack piston 28 after said cam has been released by a downward movement of the piston under the pressure of the liquid in the hydraulic brake.

The particular form of hydraulic brake shown in the drawings comprises a rotor 36 keyed at 37 to the drum shaft 13 so as to be rotated thereby as the pull on the cable 11 spins the reel drum 10. The rotor 36 is provided with vanes 38 on each face and is surrounded by a stationary housing or stator 39 which is provided with vanes 40 as in a hydraulic clutch. A packing 41 in the hub of the casing 39 prevents leakage of the liquid contents of the hydraulic brake along the shaft.

It is known that a brake of this kind contains a liquid which circulates within the housing under centrifugal force due to the rotation of the rotor vanes 38 and its braking effect is due to the resistance to rotor rotation arising from the weight of liquid circulated and the impact of the driven liquid upon the vanes of the stator and is regulated by the volume and weight of this liquid. This type of brake has no holding power when the liquid is at rest. By increasing or reducing the volume of liquid, the braking effect for a given speed of rotation of the reel (keyed to the rotor shaft) is correspondingly increased or reduced. To this end the liquid chamber of the housing is connected to a receiver 42 by a pipe 43 extending from a fitting 44 in the lower part of the receiver 42 to a passage 45 in the lower part of the housing 39.

The receiver 42 is in the form of a closed cylinder having a piston 46 with a stem 47 extending upwardly through the cylinder head 48 and fitted with a handwheel 49 whereby the position of the piston can be set. The position of wheel 49 with respect to an indicator scale 49.1 may be employed to show the volume of liquid in the hydraulic brake. The space below the piston 46 is completely filled with liquid so that the cylinder has what might be termed a pumping relation to the contents of the housing 39, whereby when the piston 46 is lowered a quantity of the liquid will be forced into the housing 39 and when the piston 46 is raised, liquid will be withdrawn from the housing 39.

The pipe 31 from the friction brake control cylinder 30 should be connected to a high pressure point in the housing 39; and inasmuch as the pipe 43 (as shown) enters the housing 39 at a point adjacent the periphery of the rotor, the pipe 31 may be connected as a branch of the pipe 43, as shown in Fig. 1.

In order that the towing cable 11 will be wound level on the drum 10 of the reel, the machine is equipped with a level winding device which comprises a pair of guide pulleys 50 in a guide member 51 that is caused to travel back and forth on a shaft 52 by means of a cam groove 53 cut into said shaft and a follower (not shown) that runs in that cam groove.

The shaft 52 is driven by a gear train, comprising gears 54, 55, and 56, driven by pinion 58 on the drum shaft 13. The guide 51 is prevented from rotating on the shaft 52 by means of a yoke 59, slidable on shaft 60, as shown by broken lines in Fig. 1.

The pinion 58 is splined to the shaft 13 as shown in Fig. 2, so that the shafts 52 and 13 will rotate in proper relation for both hauling in and paying out of the cable 11. But the pinion 58 also serves as a clutch element coacting with a complementary clutch element 61 on the hub of gear 62 of the rewinding train. The shifting of the pinion 58 is controlled by a yoke 63 for clutching and unclutching the rewinding train. The yoke 63 is fast on a shaft 64 (see Fig. 1) and is operated manually by a handle 65.

For rewinding or hauling in on the cable 11 power is supplied by an appropriate motor which may be either hydraulic or electric and is represented in Fig. 1 by the worm shaft housing 66.

As may be seen from Fig. 4 the worm 67 drives a worm-wheel 68 which is fast on an arbor 69 on which is splined a transmission unit, comprising pinions 70 and 71 coacting respectively with gears 72 and 73 fast on shaft 74 which carries a pinion 75 that meshes with gear 62, which is loose on the shaft 13 when it is not in clutching relation to the pinion 58. The transmission element 70—71 is shifted by means of a yoke 76 (Fig. 1) controlled manually by a handle 77.

In operation, a cable attached to the glider or other cargo container is provided with a large loop at its end which is releasably supported by temporary uprights so that a portion of the loop is spread horizontally above the ground in position to be engaged by a hook on the end of the towing cable of the plane. Either the glider cable or the towing cable of the plane comprises a portion or segment of resiliently stretchable cable, preferably nylon, which is of sufficient length to absorb a predetermined proportion of the initial shock on the glider or cargo container as it is jerked from its stationary position by the strain on the cable connecting it to the swift-moving plane.

The shock on the plane, due to the sudden application of the load of the glider or cargo, is additionally absorbed by the winch mechanism, partly by the paying out of the towing cable and partly by the resistance to the unreeling of the cable that is afforded by the brakes of the winch mechanism.

In a hydraulic brake of the type shown in the drawings, there is no braking effect when the parts are at rest. Consequently, the friction brake serves the function of carrying the load on the cable when the reel is at rest and of determining the initial force that is to be applied to the glider or cargo in setting it in motion. To this end, the operator on the plane sets the handle 34 so that a selected one of the notches on the cam 33 engages piston stem 27, thus depressing the lever arm 21.2 to a desired extent for determining the initial resistance of the mechanical brake (see Fig. 5) according to his judgment, taking into account the weight of the cargo.

The strain on the cable causes the reel to spin and the rotation of rotor 38 of the hydraulic brake causes the liquid therein to offer resistance, increasing with the speed of rotation of the rotor, due to the unreeling of the cable.

As the rotor speeds up, the pressure of the centrifugally circulated liquid in the hydraulic brake increases and when this reaches a predetermined amount, the corresponding pressure in the cylinder 30, due to its connection with the hydraulic brake, will depress the piston 28 and release the friction brake. At the same time the movement of the piston rod 27 out of engagement with the lever 34 allows the spring 35 to restore the lever 34 to its off-position so that the friction brake is ready to resume its holding function under the action of the spring 25 when the pressure on the piston 28 is no longer effective in holding the brake band 20 released.

As the speed of the cable drum increases, the resistance to the unreeling of the cable produced by the hydraulic brake quickly attains a maximum and thereafter the pull on the glider gradually lessens as it accelerates its speed. See curves A, Fig. 6, and G and H, Fig. 7, which are graphs calculated for an 8,000 pound glider.

As the speed of the glider approaches that of the plane, the pull on the cable gradually reduces, the unreeling of cable slows down and the pressure within the hydraulic brake falls until it releases the jack piston 28 to a point where the spring 25 restores the friction brake to its maximum holding power and brings the winch mechanism to rest.

The varying speeds of drum rotation are shown graphically in curve B, Fig. 6. Curve C shows how the friction brake cuts in and takes over the load. Curves D and E show the comparative plane and glider velocities, while curves K and L show the corresponding distances moved by each. Line M and curve N show how much cable is reeled out because of the relative distances moved by the plane and glider in unit time intervals.

Although but one specific embodiment of this invention has been herein shown and described, it is to be understood that numerous details of the structure shown may be altered or omitted without departing from the spirit of the invention as defined in the following claims.

I claim:

1. A winch comprising a cable reel, a centrifugally loaded fluid impact brake for said reel, a spring loaded brake for said reel, and mechanism actuated by the centrifugal force generated in said first-named brake for automatically releasing said spring loaded brake.

2. A winch comprising a cable reel, a centrifugally loaded fluid impact brake for said reel, a spring loaded brake for said reel, and mechanism actuated by the centrifugal force generated in said first-named brake for automatically releasing said spring loaded brake.

3. A pick-up winch, comprising a cable reel, a hydraulic brake rotor in driving relation to said reel, a brake housing around said rotor, a liquid in said housing, surfaces on said rotor for centrifugally impelling said liquid, surfaces on said housing reacting with said liquid to brake said rotor rotation, mechanical braking means normally acting on said reel to exert a predetermined minimum resistance to the rotation thereof, and hydraulic jack means actuated by liquid pressure in said housing to release said mechanical brake.

4. A pick-up winch, comprising a cable reel, a hydraulic brake rotor in driving relation to said reel, a brake housing around said rotor, a liquid in said housing, surfaces on said rotor for centrifugally impelling said liquid, surfaces on said housing reacting with said liquid to brake said rotor rotation, and mechanical braking means for said reel, comprising a brake drum, a brake lever fulcrumed at one side of said drum, a brake band around said drum and having its ends connected to said lever at opposite sides of and at respectively different distances from the fulcrum thereof, a spring acting on said lever to normally tighten said brake band, and a hydraulic jack actuated by liquid pressure in said housing and acting on said lever for releasing said brake band.

5. A pick-up winch, comprising a cable reel, a hydraulic brake rotor in driving relation to said reel, a brake housing around said rotor, a liquid in said housing, surfaces on said rotor for centrifugally impelling said liquid, surfaces on said housing reacting with said liquid to brake said rotor rotation, an expansible receiver connected to said housing for pumping liquid to and from the housing to regulate the braking power of said rotor, and mechanical braking means for said reel, comprising a brake drum, a brake lever fulcrumed at one side of said drum, a brake band around said drum and having its ends connected to said lever at opposite sides of and at respectively different distances from the fulcrum thereof, a spring acting on said lever to normally tighten said brake band, and a hydraulic jack actuated by liquid pressure in said housing and acting on said lever for releasing said brake band.

6. A pick-up winch, comprising a cable reel, a towing cable wound thereon, a rotary hydraulic brake driven by the unwinding cable pull on said reel and acting to resist rotation of said reel, a mechanical brake normally resisting rotation of said reel, and means controlled by fluid pressure in said hydraulic brake due to the unwinding speed of rotation of said reel to release said mechanical brake at a predetermined speed of said reel.

7. A pick-up winch, comprising a cable reel, a towing cable wound thereon, a rotary hydraulic brake driven by the unwinding cable pull on said reel and acting to resist rotation of said reel, a mechanical brake normally resisting rotation of said reel, means controlled by fluid pressure in said hydraulic brake due to the unwinding speed of rotation of said reel to release said mechanical brake at a predetermined speed of said reel, said mechanical brake being adapted when engaged to offer less resistance to rewinding than to unwinding rotation of said reel, and power means for rewinding said cable.

8. A pick-up winch, comprising a cable reel, a towing cable wound thereon, a rotary hydraulic brake driven by the unwinding cable pull on said reel and acting to resist rotation of said reel, a mechanical brake normally resisting rotation of said reel, means controlled by fluid pressure in said hydraulic brake due to the unwinding speed of rotation of said reel to release said mechanical brake at a predetermined speed of said reel, said mechanical brake being adapted when engaged to offer less resistance to rewinding than to unwinding rotation of said reel, and a variable control abutment for setting the initial braking resistance of said mechanical brake.

9. A pick-up winch, comprising a cable reel, a towing cable wound thereon, a rotary fluid impact brake driven by said reel and affording resistance to the rotation of said reel increasing with the increase of reel speed, a mechanical brake normally resisting rotation of said reel, means controlled by fluid pressure in said fluid impact brake to release said mechanical brake at a predetermined speed of said reel, said mechanical brake being adapted when engaged to offer less resistance to rewinding than to unwinding rotation of said reel, a variable control abutment for setting the initial braking resistance of said mechanical brake, and a spring normally urging said control abutment to an off position through the operation of said speed-controlled brake-releasing means.

10. A pick-up winch, comprising a cable reel, towing cable wound thereon, a fluid impact brake driven by said reel and affording resistance to the rotation of said reel increasing with the increase of reel speed, a mechanical brake normally resisting rotation of said reel, and means controlled by fluid pressure in said fluid impact brake to release said mechanical brake at a predetermined speed of said reel.

EMORY N. KEMLER.

REFERENCES CITED

The following references are of record in the file of this patent:

UNITED STATES PATENTS

| Number | Name | Date |
| --- | --- | --- |
| 1,347,303 | Stone | July 20, 1920 |
| 1,941,158 | Spinetta | Dec. 26, 1933 |
| 1,985,889 | De La Mater et al. | Jan. 1, 1935 |
| 1,992,912 | De La Mater | Feb. 26, 1935 |
| 2,246,923 | Meunier | June 24, 1941 |
| 2,256,154 | Smaltz et al. | Sept. 16, 1941 |